Oct. 24, 1944. S. T. SCHLEIER 2,361,321
MINNOW TRAP
Filed Sept. 9, 1942

S. T. Schleier
INVENTOR.
BY

Patented Oct. 24, 1944

2,361,321

UNITED STATES PATENT OFFICE 2,361,321

MINNOW TRAP

Sylvester Theron Schleier, St. Louis, Mo.

Application September 9, 1942, Serial No. 457,760

1 Claim. (Cl. 43—65)

This invention relates to minnow traps, one of the objects being to provide a trap which is simple in construction but very efficient in use and which will trap more minnows in a given time than other types of structures designed for the same purpose.

A still further object is to provide a trap which can be made almost entirely of a transparent material such as glass or plastic although it is to be understood that, if desired, it could be made of other materials.

A still further object is to provide a trap which will not roll or shift out of position after being placed in a body of water.

Another object is to provide a structure of this character which can readily be anchored in place and can be easily lifted and carried.

Another object is to construct the trap of the minimum number of parts.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
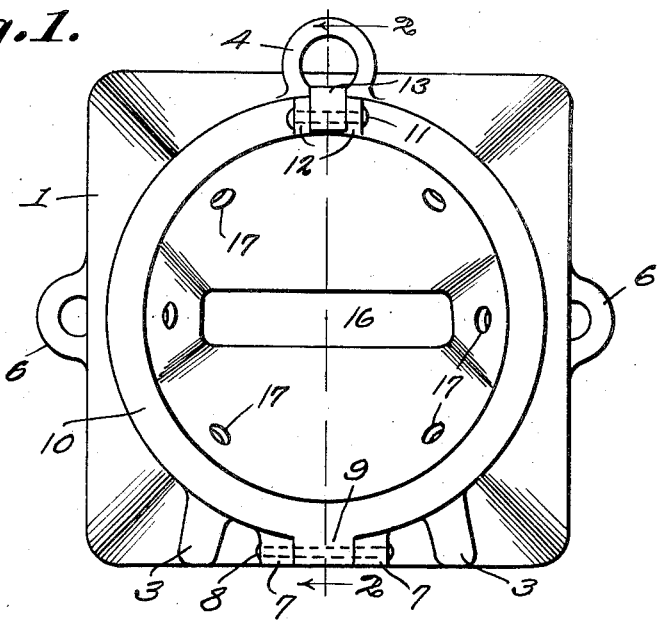
Figure 1 is a front elevation of the trap.

Referring to the figures by characters of reference, 1 designates the body or container portion of the trap. This can be of any shape desired. In the structure illustrated the body is round at one end but angular at its other or back end. Furthermore in the structure illustrated this body is formed of a transparent material such as glass, plastic or the like but it is to be understood that it could be made of other materials although a transparent material serves better as a trap. The body or container 1 is open at one end only and said open end has an interior annular flange 2 integral therewith. Spaced downwardly extended lugs 3 are formed at the lower portion of the open end of the body and constitute legs whereby the device can be caused to rest evenly on the bottom of a stream or other body of water. Formed on the top of the body adjacent to the open end thereof is a ring-like ear 4 the lower portion of which provides a retaining bead 5. This ear constitutes a handle whereby the device can be lifted readily out of position or lowered in place. Additional apertured ears 6 are located on the sides of the body at the back or closed end thereof and provide a means whereby anchoring lines can be attached to the structure.

Figure 2:
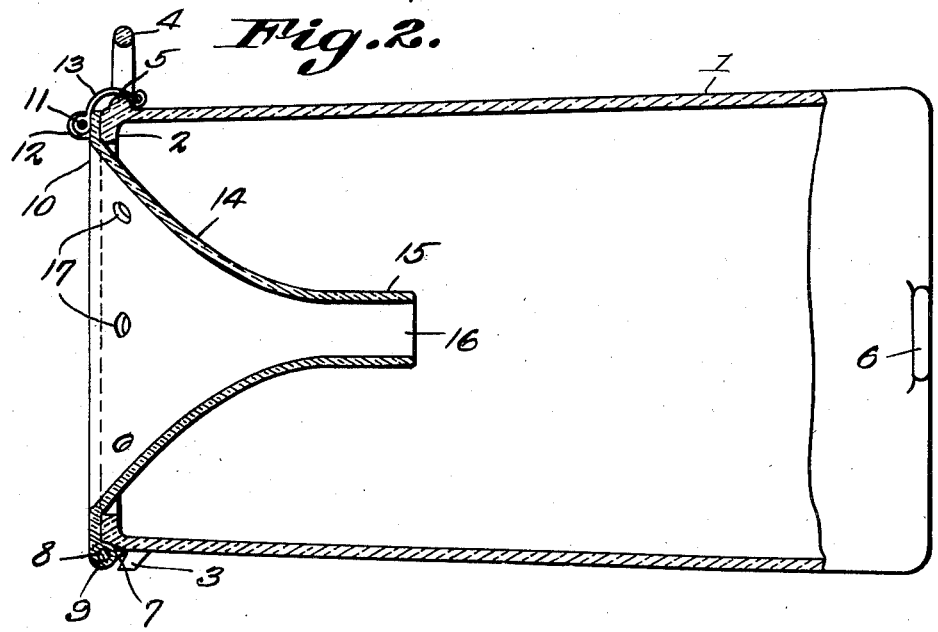
Figure 2 is a section on line 2—2, Figure 1.

Between the legs 3 there are provided lugs 7 which are spaced apart and adapted to receive a pivot pin 8. This pin is extended through a lug 9 on the bottom portion of a lid 10 which is shaped at its margin to fit snugly against the flange 2 and is provided, at points diametrically opposed to the lug 9, with a pivot pin 11 extending through a pair of lugs 12 integral with the lid. This pin carries a spring latch 13 mounted to swing thereon and to snap into engagement with the bead 5 as shown in Fig. 2, thereby to hold the lid in closed position.

The lid, which can be formed of glass, plastic or any other suitable material has an integral inwardly tapered portion 14 extending back into the body 1 and merging into a throat portion 15 the opening 16 of which is substantially oblong with its long diameter extending transversely of the lid as shown in Fig. 1. Small supplemental openings 17 can be provided in this lid adjacent to the flange 2.

In practice suitable bait is placed in the container or body 1 and lid 10 is then fastened in closed position as shown. The trap is placed in the water where the minnows are to be trapped and the back portion of the bottom thereof, in cooperation with the legs 3 extending from the round forward end of the body, will serve to hold the trap firmly on the supporting surface. The lowering of the trap can be effected easily by grasping the ear 4 which constitutes a handle. The trap can also be anchored in place by attaching anchoring cords or the like to the ears 6.

The body 1 will of course fill with water. Minnows approaching the bait will be deflected by the inwardly tapered portion 14 of the lid toward the throat 16 and as this throat is elongated transversely, it will be obvious that more minnows can pass through at a time than would be possible should an ordinary round opening be used.

The holes 17 constitute vents and facilitate circulation of water within the trap, thereby aiding in the effluence of the bait which is placed in the trap.

It has been found in practice that, because of the particular construction of this device, a greater number of minnows can be captured in a given period than with the conventional types of traps which usually allow only one minnow to enter at a time. This is due primarily to the fact that while the inlet member 14 in this trap is circular and follows the configuration of a cone at the large end, it is gradually flattened out laterally and elongated toward the center or delivery end so that a laterally extended elongated slot 16 is thus provided toward which the walls of the inlet member extend along curved lines. These walls are smooth and transparent and there is nothing in the inlet member which would tend to retard the travel of the minnows into the trap. Minnows usually travel in schools and should the member 14 be provided with any element which would tend to bar momentarily the movement of one or more minnows toward the opening 16, the member 14 would quickly become clogged and many of the minnows would be prevented from entering the trap. By providing an inlet member the walls of which gradually converge to a wide diametrical slot, however, and which member is free from all obstructions, the minnows, after entering the large end of the inlet member, are gently deflected toward the slot and will swim quickly through it without being subjected to any serious retardation.

Importance is also attached to the fact that the body or container 1 is in the nature of a jar of peculiar configuration one end of which is angular while the other end of it is round, the round end toward which the walls of the container are tapered, being held against rotation by the lugs 3 which, in cooperation with the bottom of the rectangular end of the container, serve to maintain the trap in a substantially horizontal position on the bed of the body of water in which the trap is located.

As before stated the shape and material of the body or container 1 can be varied at will.

What is claimed is:

A minnow trap including a jar-like body closed at one end and open at its other end, the open end of the body being round and having an inturned flange integral therewith, said body being imperforate, and a lid constituting an intake member hingedly connected to the body and proportioned to bear flat against the flange when the lid is closed, said lid having a concentric substantially conical portion extended into the body and gradually decreasing in height and increasing in width toward its inner end, thereby defining a diametrical slot at its inner end toward which the walls of said conical portion merge along smooth curved lines, said slot providing an opening for the admission of minnows to the body, there being supplemental small openings in the conical portion adjacent to the flange, said lid and the body being formed of transparent material, and means for holding the lid against the flange.

SYLVESTER THERON SCHLEIER.